1,497,601

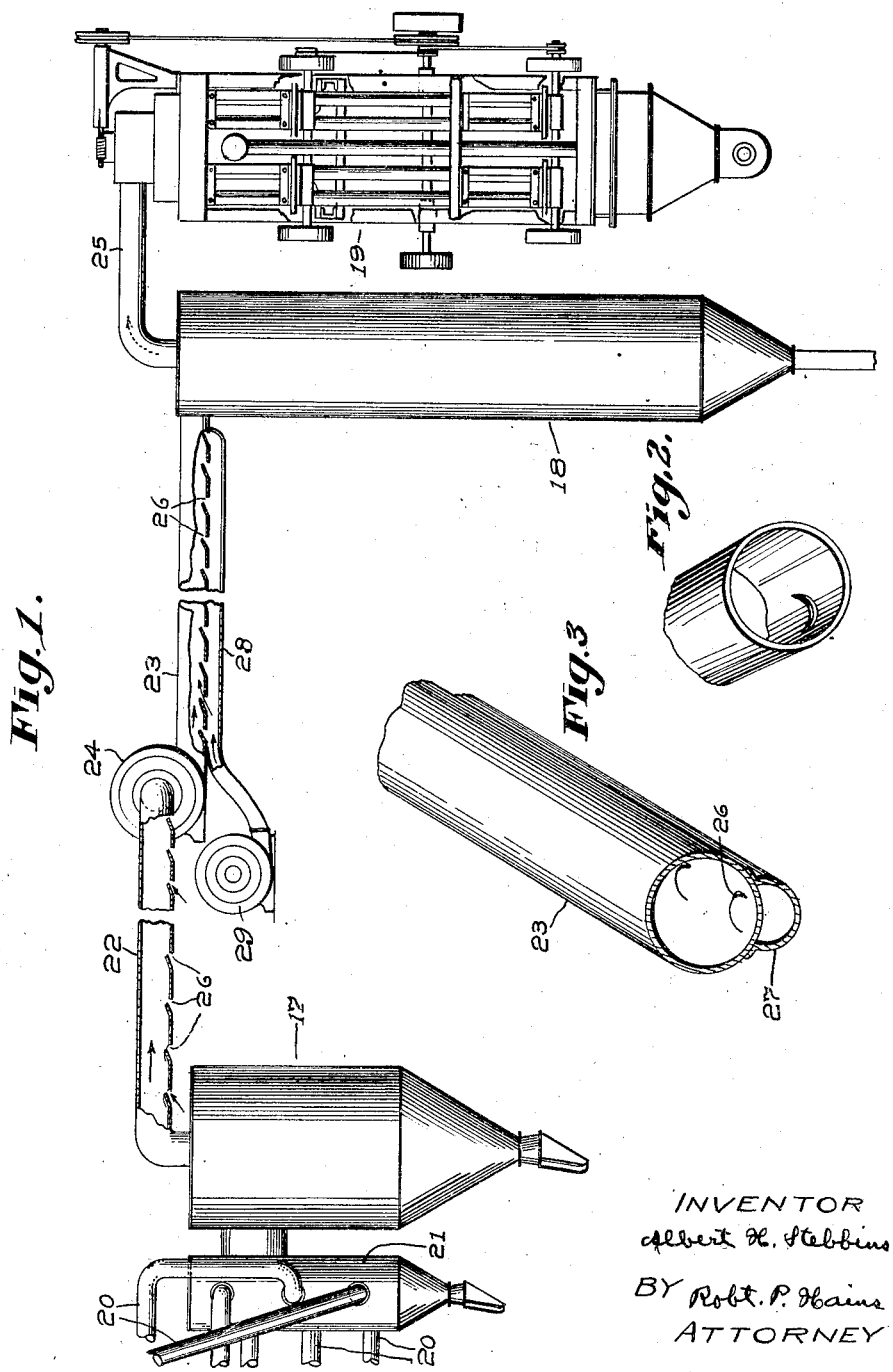
June 10, 1924.
A. H. STEBBINS
1,497,601
DUST COLLECTING AND CONVEYING UNIT
Filed June 24, 1922
INVENTOR
Albert H. Stebbins
BY Robt. P. Hains
ATTORNEY Patented June 10, 1924.

UNITED STATES PATENT OFFICE.

ALBERT H. STEBBINS, OF LOS ANGELES, CALIFORNIA.

DUST COLLECTING AND CONVEYING UNIT.

Application filed June 24, 1922. Serial No. 570,560.

*To all whom it may concern:*

Be it known that I, ALBERT H. STEBBINS, a citizen of the United States, residing at Los Angeles, in the county of Los Angeles and State of California, have invented an Improvement in Dust Collecting and Conveying Units, of which the following description, in connection with the accompanying drawings, is a specification, like characters on the drawings representing like parts.

This invention relates to a dust collecting and conveying unit, and to means for preventing the formation of dust bars in the pipes through which the dust travels.

In ore treating mills and in various other plants, machines are used which produce considerable dust, and in many cases it is desirable to remove the dust from these machines and to extract the dust from the dust laden air.

When the dust laden air contains dust that varies extensively in specific gravity and in the size of the particles, it is not practical to remove the dust completely from the air in a single operation, and in accordance with the present invention the dust is removed from the air successively by different types of dust collectors.

When a pipe which conducts dust laden air extends in approximately a horizontal direction, the heavier particles of dust within the air tend to lodge along the lower inner wall of the pipe and form dust bars thereupon. These dust bars interfere with the passage of air through the pipe, and may gradually increase in size until they fill up the pipe.

Important features of the present invention, therefore, reside in a dust collecting and conveying unit for passing dust ladened air successively through different dust collectors, and in a construction which prevents large dust bars from forming within a pipe through which dust ladened air is passed.

Other features of the invention and novel combination of parts in addition to the above will be hereafter described in connection with the accompanying drawings which illustrate one good practical form thereof.

In the drawings:

Fig. 1 is a side elevation of a dust collecting and conveying unit with the pipes for conducting the dust ladened air shown partly in section.

Fig. 2 is an enlarged perspective view of a portion of a pipe of Fig. 1; and

Fig. 3 is an enlarged perspective view of a portion of a different pipe of Fig. 1.

In Fig. 1 of the drawing the dust collecting and conveying unit is shown as consisting of a suction dust collector 17, a blast dust collector 18, and a dust filter 19. The suction dust collector 17 may receive dust laden air from a number of different sources through pipes 20, and these pipes may discharge into an auxiliary container 21 connected to the dust collector 17. The suction dust collector may be variously constructed and one good practical form thereof is shown, described and claimed in my application No. 552,175, filed April 13, 1922. The dust collectors 17 and 18 are connected by pipes 22 and 23, and the pipe 22 is shown as extending from the dust collector 17 to the suction side of a fan 24 while the pipe 23 extends from the blast side of the fan to the dust collector 18. The arrangement is such that the fan 24 serves to suck dust laden air from various sources into the dust collector 17, and as the dust laden air passes through the dust collector considerable dust is removed. The air then passes through the fan 24 and is forced by this fan through the blast dust collector 18 for further treatment.

The blast dust collector 18 may be of various construction, and one good form is shown, described and claimed in my application No. 553,120, filed April 15, 1922. If further removal of dust from the air is desired, the air that is discharged from the dust collector 18 may be conducted by a pipe 25 to the dust filter 19 preferably provided with fabric tubes through which the air may escape leaving the dust in the tubes. One form of dust filter which is well adapted for the purpose is shown, described and claimed in my application No. 565,199, filed June 1, 1922.

As above stated, it is found that if dust ladened air is caused to pass through pipes or conduits that extend in a horizontal direction, the heavier particles of dust passing through the pipe will tend to lodge upon the lower wall of the pipe and form objectionable dust bars thereupon which may increase in size until they seriously obstruct or entirely close the air passage through the pipe.

The size or thickness attained by dust bars within a pipe depends largely upon the length of the dust bars, and if the length of the dust bars that form in a pipe is restricted, the size or thickness of the bars will be correspondingly restricted. The present invention therefore contemplates simple means for restricting the length of the dust bars that may form in horizontally extending pipes. This is accomplished by forming apertures 26 in the lower wall of the pipes 22 and 23 through which air may enter to break up the dust bars into short lengths; and this in turn will restrict the size or thickness of the dust bars as above pointed out.

The suction produced in the pipe 22 by the fan 24 serves to suck air inwardly through each of the apertures 26 as indicated by the arrows, with the result that the dust bars will be prevented from forming across these apertures. The apertures 26 are preferably formed by bending a portion of the pipe inwardly to form lips 27 (Fig. 2) that are disposed to prevent dust from escaping from the pipe through the apertures. The diameter of the pipe 22 preferably increases slightly in the direction in which the air passes therethrough, to accommodate the additional air that enters through the apertures.

Since the pipe 23 is connected to the blast side of the fan 24, it is necessary to provide auxiliary means for forcing air inwardly through the apertures 26 of this pipe. To this end the pipe 23 is provided with a housing 28 that extends over the apertures 26, and air is forced into this housing by an auxiliary fan 29 and under sufficient pressure to force the air from the fan 29 into the pipe 23 through the apertures 26.

What is claimed is:

1. A dust collecting and conveying unit, comprising in combination, a suction dust collector and a blast dust collector disposed a substantial distance apart, a fan, a pipe extending in substantially a horizontal direction from the suction dust collector to the suction side of said fan, a pipe extending in substantially a horizontal direction from the blast side of the fan to the blast dust collector, and each pipe having apertures at intervals along its lower side to admit air through the wall of the pipe to break up dust bars that tend to form along the lower side of the pipe.

2. A dust collecting and conveying unit, comprising in combination, a suction dust collector and a blast dust collector disposed a substantial distance apart, a pipe extending in a horizontal direction from one dust collector to the other and provided with apertures disposed at intervals along its length to admit air through the wall of the pipe to break up dust bars that tend to form within the pipe, a fan interposed between the ends of the pipe for producing a suction through one portion of the pipe and the suction dust collector and for producing a blast through the remaining portion of the pipe and the blast dust collector, and auxiliary blast means for forcing air into the blast portion of the pipe through the apertures thereof.

3. A dust collecting and conveying unit, comprising in combination, a suction dust collector and a blast dust collector, a pipe for conducting dust laden air from one dust collector to the other, provided with apertures disposed at intervals along its length to admit air through the wall of the pipe to break up dust bars that tend to form within the pipe, a fan interposed between the ends of the pipe for producing a suction throughout one portion of the pipe and a blast throughout another portion, a housing extending over the apertures of the blast portion of the pipe, and means for forcing air into the housing to cause air to enter the blast portion of the pipe through said apertures.

4. A dust collecting and conveying unit, comprising in combination, a suction dust collector and a blast dust collector disposed a substantial distance apart, a fan, a pipe extending from the suction dust collector to the fan and provided with apertures disposed at intervals along its length to admit air through the wall of the pipe to break up dust bars that tend to form therein and the pipe having its diameter increased slightly toward the fan to accommodate the additional air that enters through the apertures, and a pipe extending from the blast side of the fan to the blast dust collector and having apertures disposed at intervals along its lower wall to admit air to break up dust bars that tend to form therein.

In testimony whereof, I have signed my name to this specification.

ALBERT H. STEBBINS.